US012638754B2

(12) United States Patent
Kim et al.

(10) Patent No.: US 12,638,754 B2
(45) Date of Patent: May 26, 2026

(54) SYSTEM FOR PROVIDING PHOTOGRAPHY SERVICE AND OPERATION METHOD THEREOF

(71) Applicant: SEOBUK Co., Ltd., Choenan-si (KR)

(72) Inventors: Min Seok Kim, Cheonan-si (KR);
Byeong Jun Kim, Cheongju-si (KR);
Jae won Lee, Cheonan-si (KR)

(73) Assignee: SEOBUK Co., Ltd., Choenan-si (KR)

( * ) Notice: Subject to any disclaimer, the term of this patent is extended or adjusted under 35 U.S.C. 154(b) by 263 days.

(21) Appl. No.: 18/490,799

(22) Filed: Oct. 20, 2023

(65) Prior Publication Data

US 2025/0093753 A1 Mar. 20, 2025

(30) Foreign Application Priority Data

Sep. 15, 2023 (KR) ......................... 10-2023-0123448

(51) Int. Cl.
*G03B 17/53* (2021.01)
*G06F 3/04845* (2022.01)
*G06K 7/14* (2006.01)
*G06T 5/20* (2006.01)

(52) U.S. Cl.
CPC ......... *G03B 17/53* (2013.01); *G06F 3/04845* (2013.01); *G06K 7/1447* (2013.01); *G06T 5/20* (2013.01)

(58) Field of Classification Search
None
See application file for complete search history.

(56) References Cited

U.S. PATENT DOCUMENTS

| | | | | | |
|---|---|---|---|---|---|
| 6,085,195 | A | * | 7/2000 | Hoyt | ....................... G03B 17/53 |
| 9,270,847 | B2 | * | 2/2016 | De Rosa | ................. H04L 67/52 |
| 2012/0300087 | A1 | * | 11/2012 | Shore | ..................... G06Q 10/10 |
| | | | | | 709/204 |
| 2020/0090015 | A1 | * | 3/2020 | Fujimoto | ........... H04N 1/00119 |
| 2020/0219177 | A1 | * | 7/2020 | He | .......................... G06Q 30/06 |

FOREIGN PATENT DOCUMENTS

| | | | | |
|---|---|---|---|---|
| CN | 114237521 | * | 3/2022 | ......... H04N 1/00413 |
| JP | 2016-174290 | A | 9/2016 | |
| JP | 2017-120505 | A | 7/2017 | |
| JP | 2017-151540 | A | 8/2017 | |
| JP | 2019-040363 | A | 3/2019 | |

OTHER PUBLICATIONS

Design and Implementation of Digital Photo Kiosk System with Auto Color-Correction Module (Year: 2005).*

* cited by examiner

*Primary Examiner* — Victoria E. Frunzi
(74) *Attorney, Agent, or Firm* — INVENSTONE PATENT, LLC

(57) ABSTRACT

A system for providing a photography service and an operation method thereof are provided. The operation method includes printing, by a photography kiosk of the system, a photo output including at least one image and a two-dimensional code; identifying, by a user terminal of the system, the two-dimensional code using a photographing device of the user terminal; receiving, by the user terminal, the at least one image or a time-lapse video corresponding to the at least one image, the at least one image or the time-lapse video received from a server of the system; and downloading, by the user terminal, the at least one image or the time-lapse video.

12 Claims, 10 Drawing Sheets

SYSTEM FOR PROVIDING PHOTOGRAPHY SERVICE AND OPERATION METHOD THEREOF

CROSS-REFERENCE TO RELATED APPLICATIONS

This application claims the priority of Korean Patent Application No. 10-2023-0123448 filed on Sep. 15, 2023, in the Korean Intellectual Property Office, the disclosure of which is incorporated herein by reference.

BACKGROUND OF THE DISCLOSURE

Technical Field

The present disclosure relates to a system for providing a photography service and an operation method thereof. More specifically, the present disclosure relates to a system and method capable of providing services that allow users to download photographed images or time-lapse videos corresponding thereto from a user terminal by providing a user with a photo output including a two-dimensional code.

Background Art

The experience of unmanned photo studios that provide self-photography services is establishing itself as a new culture of recreational activity in which the younger generation expresses themselves and appeals to themselves. Even though smartphones have developed into high-performance cameras, consumers are enthusiastic about printed photos so that they can make memories in an analog manner rather than having digital photos.

Self-photo booths have rapidly developed in various manners, ranging from self-studios where users photograph themselves with a remote control, to methods that print pictures immediately after taking pictures at a low price.

For example, Photoism, which provides a self-photography service with the concept of an unmanned photo studio, operates about 350 stores in Korea, and the number of the stores is increasing rapidly.

The self-photo booth is operated as a version of a selfie-stick camera that has been popular. The self-photo booth differs from selfie-stick cameras in that they are in the form of various small studios. While selfie-stick cameras have focused mainly on persons, recent self-photo booths allow for a variety of presentations by utilizing a large space. In addition, unlike in the past, information technology (IT) such as high-resolution cameras, convenient payment systems, and remaining print paper notification systems were incorporated in the self-photo booth, so the use of the self-photo booth by customers has been facilitated and operators' management therefor has become easier.

Recently, competitiveness of photo booths, which were similar for each company, is being determined by software and design. A design of a photo output printed in an unmanned photo studio is an important factor that appeals to a variety of customer bases. Users can prepare desired props, enter photo booths with desired backgrounds and take photos, directly select a desired theme frame, photo placement, and color tone and print a photographic print with a desired design.

However, recently, the needs of customers who want to own photos with desired designs not only as photo outputs but also as digital files are increasing.

If photos cannot be provided as digital files, they have a drawback in which there is no method of replacing offline photo outputs if they are lost.

SUMMARY OF THE DISCLOSURE

Existing self-photography services do not provide digital files, so they have a drawback in which there is no way to replace offline photo outputs if they are lost.

Additionally, there is a drawback in that photo outputs do not allow for users to modify or correct photographed photos in detail to suit the user's taste.

Accordingly, problems to be solved of the present disclosure are to solve these existing defects, and a new method that allows users to transmit captured photos to the users as digital files, in addition to photo printing.

As a result, the inventors of the present disclosure have attempted to develop a method that allows users to download photographed images or time-lapse videos corresponding thereto from a user terminal by providing photo outputs including a two-dimensional code to the user.

In particular, the inventors of the present disclosure have strived to develop a method of downloading photographed images or corresponding time-lapse videos into an application when a two-dimensional code is identified in conjunction with an application installed on a user terminal.

The problems of the present disclosure are not limited to the problems mentioned above, and other problems not mentioned will be clearly understood by those skilled in the art from the description below.

In order to solve the problem of the present disclosure, an operation method of a system for providing a photography service according to an exemplary embodiment of the present disclosure is provided. The method includes printing a photo output including at least one image and a two-dimensional code by a photography kiosk; identifying the two-dimensional code by a user terminal, using a photographing device of the user terminal; receiving the at least one image or a time-lapse video corresponding to the at least one image from a server, by the user terminal; and downloading the at least one image or the time-lapse video, by the user terminal.

According to a feature of the present disclosure, the two-dimensional code includes a QR code or a barcode, and the operation method further includes accessing a download web address obtained by parsing the two-dimensional code, by the user terminal.

According to a feature of the present disclosure, the operation method further includes performing member registration and login by the user terminal, according to a user's input; generating matching data by matching the at least one image or the time-lapse video with the user's member information, by the server; and downloading, by the user terminal, the at least one image or the time-lapse video corresponding to the user from the server, based on the matching data.

According to a feature of the present disclosure, an application is installed in the user terminal, and when capturing the two-dimensional code using the application, the operation method further includes, downloading, by the user terminal, the at least one image or the time-lapse video into a photo library of the application.

According to another feature of the present disclosure, the operation method further includes downloading, by the user terminal, the at least one image or the time-lapse video into the photo library of the application, if the user performs pre-setting to store the at least one image or time-lapse video in the application when the user receives the at least one image or time-lapse video from the server.

In order to solve the problems described above, a system for providing a photography service according to another exemplary embodiment of the present disclosure is provided. The system includes a photography kiosk configured to print a photo output including an image and an identification mark; a server configured to store the image or a time-lapse video corresponding to the image; and a user terminal configured to identify the identification mark using a photographing device, receive the image or the time-lapse video corresponding to the image from the server, and download the image or the time-lapse video.

According to a feature of the present disclosure, the user terminal is further configured to provide a user interface for editing the at least one image or the time-lapse video downloaded using the application.

According to another feature of the present disclosure, the user terminal is further configured to provide a user interface for correcting at least one user's body portion included in the at least one image or the time-lapse video using the application, or applying a filter to the at least one image or the time-lapse video.

In order to solve the problems described above, a photography kiosk device for providing a photography service according to another exemplary embodiment of the present disclosure is provided. The photography kiosk device includes a display unit; an interface unit; a photographing unit; an outputting unit; and a control unit, wherein the control unit includes a memory and one or more processors that execute a program loaded into the memory, wherein the program includes instructions for displaying a photographing guide screen allowing for selection of a photographing mode through the display unit; instructions for photographing through the photographing unit; and instructions for printing a photo output including at least one image and a two-dimensional code through the outputting unit, and wherein the two-dimensional code includes information about a web address for downloading the at least one image or a time-lapse video corresponding to the at least one image.

Specific details of other embodiments are included in the detailed description and drawings.

According to an exemplary embodiment of the present disclosure, images and time-lapse videos where users are photographed are provided to the users through a photography kiosk, so that it is possible to provide customers with the opportunity to have the photographed images as digital files.

Additionally, according to an exemplary embodiment of the present disclosure, a user can modify or correct a downloaded image in detail to suit the user's taste.

In addition, according to an exemplary embodiment of the present disclosure, users can more conveniently store and manage digital files using an application, so user convenience can be increased, thereby helping increase sales of self-photography services.

Various and beneficial advantages and effects of the present disclosure are not limited to those described above, and further various effects are included in the present specification.

DETAILED DESCRIPTION OF THE EMBODIMENT

Figure 1A:
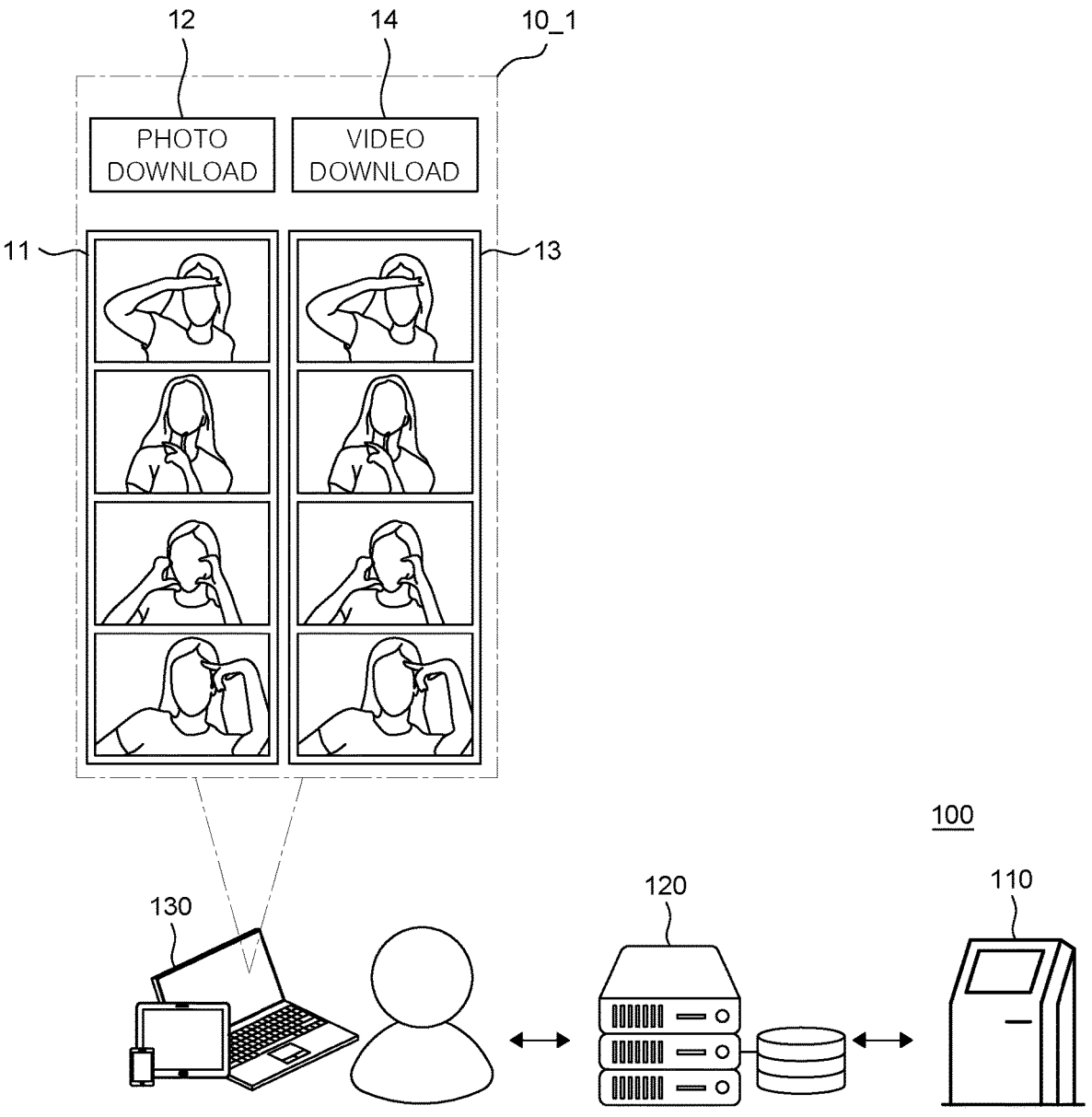
FIGS. 1A and 1B are diagrams illustrating a system for providing a photography service and a screen displayed on a user terminal according to an exemplary embodiment of the present disclosure.

Advantages and features of the present disclosure and methods to achieve them will become apparent from descriptions of embodiments herein below with reference to the accompanying drawings. However, the present disclosure is not limited to the embodiments disclosed herein but may be implemented in various different forms. The embodiments are provided to make the description of the present disclosure thorough and to fully convey the scope of the present disclosure to those skilled in the art. It is to be noted that the scope of the present disclosure is defined only by the claims. In connection with the description of drawings, the same or like reference numerals may be used for the same or like elements.

In the disclosure, expressions "have," "may have," "include" and "comprise," or "may include" and "may comprise" used herein indicate presence of corresponding features (for example, elements such as numeric values, functions, operations, or components) and do not exclude the presence of additional features.

In the disclosure, expressions "A or B," "at least one of A or/and B," or "one or more of A or/and B," and the like used herein may include any and all combinations of the associated listed items. For example, the "A or B," "at least one of A and B," or "at least one of A or B" may refer to all of case (1) where at least one A is included, case (2) where at least one B is included, or case (3) where both of at least one A and at least one B are included.

The expressions, such as "first," "second," and the like used herein, may refer to various elements, but do not limit the order and/or priority of the elements. Furthermore, such expressions may be used to distinguish one element from another element but do not limit the elements. For example, a first user device and a second user device indicate different user devices regardless of the order or priority. For example, without departing from the scope of the present disclosure, a first element may be referred to as a second element, and similarly, a second element may also be referred to as a first element.

It will be understood that when an element (for example, a first element) is referred to as being "(operatively or communicatively) coupled with/to" or "connected to" another element (for example, a second element), it can be understood as being directly coupled with/to or connected to another element or coupled with/to or connected to another element via an intervening element (for example, a third element). On the other hand, when an element (for example, a first element) is referred to as being "directly coupled with/to" or "directly connected to" another element (for example, a second element), it should be understood that there is no intervening element (for example, a third element) therebetween.

According to the situation, the expression "configured to (or set to)" used herein may be interchangeably used with, for example, the expression "suitable for," "having the capacity to," "designed to," "adapted to, "made to," or "capable of." The term "configured to (or set to)" may not necessarily mean only "specifically designed to" in hardware. Instead, the expression "a device configured to" in any situation may mean that the device is "capable of operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified embodiments of the present disclosure and are not intended to limit the scope of other embodiments. The terms of a singular form may include plural forms unless otherwise specified. All the terms used herein, which include technical or scientific terms, may have the same meaning that is generally understood by a person skilled in the art. It will be further understood that terms which are defined in a dictionary among terms used in the disclosure, can be interpreted as having the same or similar meanings as those in the relevant related art and should not be interpreted in an idealized or overly formal way, unless expressly defined in the present disclosure. In some cases, even in the case of terms which are defined in the specification, they cannot be interpreted to exclude embodiments of the present disclosure.

Features of various exemplary embodiments of the present disclosure may be partially or fully combined or coupled. As will be clearly appreciated by those skilled in the art, technically various interactions and operations are possible, and respective embodiments may be implemented independently of each other or may be implemented together in an associated relationship.

For clarity of interpretation of the present specification, terms used herein will be defined below.

The term "photography kiosk" refers to an unmanned information terminal for taking pictures. When using a photography kiosk, a user can check an image that is captured through a touch screen and print it immediately after capturing it using a remote control or timer. The photography kiosk may also be referred to as a "photo kiosk."

The term "image" refers to photo(s) captured by a photographing unit of the photography kiosk. One or more users can be captured in the image, and a photo output may include one or more images. According to embodiments, the "image" may refer to images printed on the photo output, or may refer to a partial captured cut of a video.

The term "time-lapse video" refers to a method of projecting a subject that moves at a certain time at normal speed, or a result captured through this method. Various exemplary embodiments of the present specification can also be applied to results that are captured through various imaging techniques such as time-lapse, hyper-lapse and the like. Although "time-lapse video" is exemplified in the present specification, image capturing techniques do not limit the scope of claims of the present disclosure.

The term "photo output" refers to a print that is output from a photography kiosk. The photo print may also be referred to as a photo seal, or may be in the form of a sticker.

The term "application" refers to a photographic application that is linked to a photography kiosk 110 and/or a server system 120 and provides various functions to a user who uses a self-photography service. For example, by using the application, the user can search domestic, nationwide stores and store captured photos or time-lapse videos.

Hereinafter, a system for providing a photography service and an operation method thereof according to the present disclosure will be described in detail with reference to the drawings.

Figure 1B:
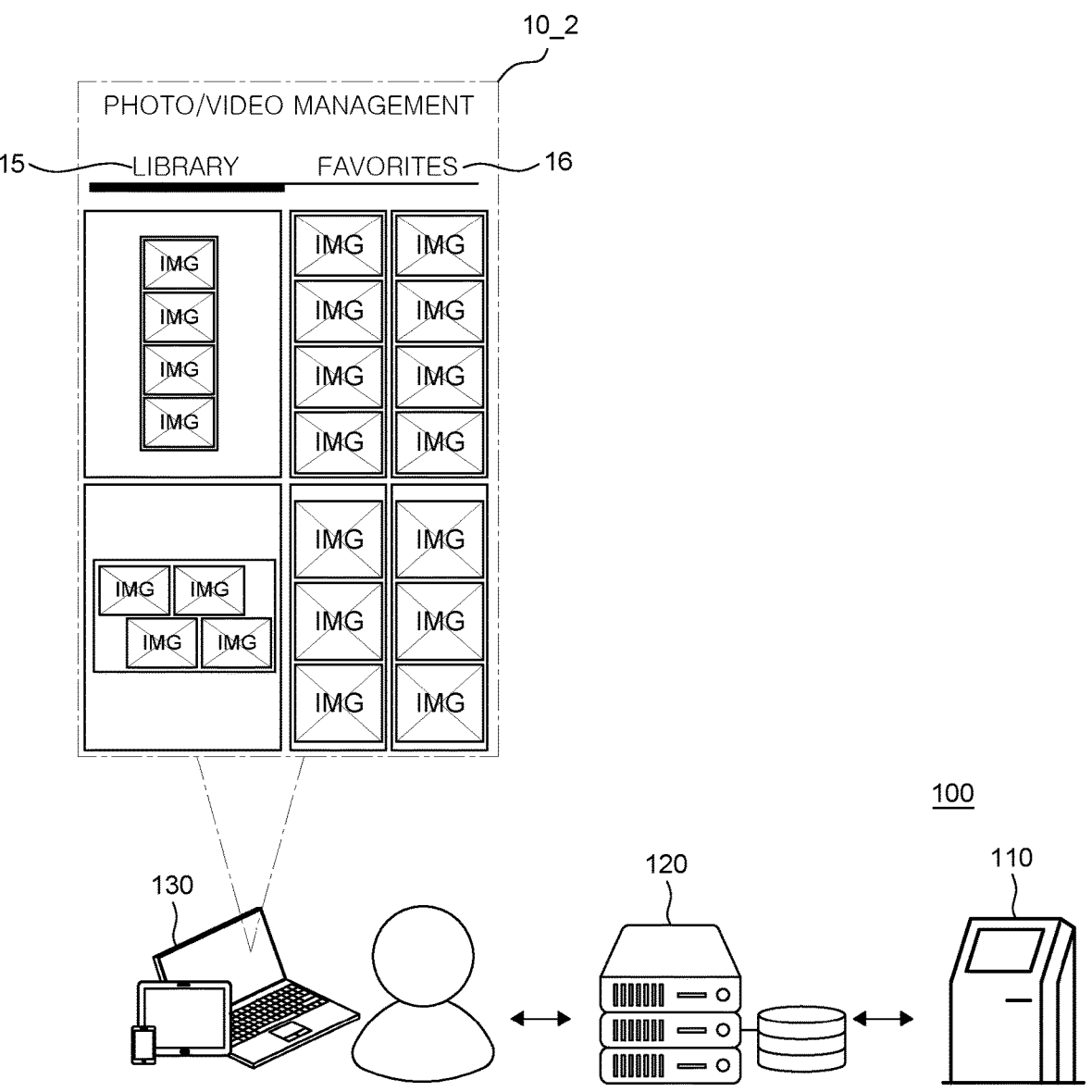

FIGS. 1A and 1B are diagrams illustrating a system for providing a photography service and a screen displayed on a user terminal according to an exemplary embodiment of the present disclosure.

Referring to FIGS. 1A and 1B, a system (hereinafter, also referred to as a self-photography system) 100 for providing a photography service according to an exemplary embodiment of the present disclosure may include the photography kiosk 110, the server system 120, and a user terminal 130.

The photography kiosk 110 is configured to provide a self-photography service that allows users to take pictures themselves and print taken photos. The photography kiosk 110 may generate resources (e.g., photographed image(s) or time-lapse video(s)) after photographing and upload them to a touch screen. The photography kiosk 110 can print photo outputs including image(s) and two-dimensional codes. In addition, the photography kiosk 110 may provide printed photo outputs and at the same time, provide taken image(s) and/or videos such as time-lapse video(s) to the user, in the form of digital files. A more detailed configuration of the photography kiosk 110 is disclosed in detail through FIGS. 3A and 3B.

The server system 120 may receive user-photographed image(s) and/or videos such as time-lapse videos, kiosk information, user data, matching data, and the like from the photography kiosk 110 and store them. The server system 120 may provide an identification code that allows for access to a location where photos photographed through the photography kiosk 110 are stored. In addition, the server system 120 may provide the image(s) and/or time-lapse videos to the user terminal 130 in response to a request for the photographed image(s) and/or time-lapse videos by the user terminal 130 that identifies a two-dimensional code. The server system 120 may include a kiosk management server, a content management system (CMS) DB server, a storage server, and a mobile DB server. A more detailed configuration of the server system 120 is disclosed in detail with reference to FIG. 2.

The user terminal 130 may be a device that is possessed by a user who wants to take a self-photography using the photography kiosk 110. The user terminal 130 may be a portable digital device that includes a memory means and a microprocessor and thus, has computing power, such as a smart phone, a tablet PC, a PC, a laptop or the like, but it is not limited to a specific form. The user terminal 130 may download photographed image(s) and/or videos such as time-lapse videos.

FIG. 1A illustrates a display screen 10_1 of a download web address (URL), which is accessed after a user captures a two-dimensional code in a photo output using a photographing device of the user terminal 130.

According to an exemplary embodiment of the present disclosure, the two-dimensional code included in the photo output may include information about the download web address. Thus, the user can access a download web address link that is obtained by parsing a captured QR code. The display screen 10 of the download web address may include image(s) 11 and a photo download button 12. The display screen 10 of the download web address may display time-lapse video(s) 13 and a video download button 14. The user terminal 130 can access the download web address link that is obtained by parsing the QR code and download photographed image(s) and/or videos such as time-lapse videos.

FIG. 1B illustrates a display screen 10_2 of an application that is installed on the user terminal 130.

According to an exemplary embodiment, the application may include a photo/video management item. The photo/video management item may be configured to include a library (or photo library) 15 tab that can store photographed image(s) and/or time-lapse video(s), and/or a favorites 16 tab that can store some image(s) and/or time-lapse video(s) that are intended to be separately stored among the photographed image(s) and/or time-lapse video(s). On the display screen 10_2 according to an exemplary embodiment, image(s) and/or time-lapse video(s) composed of various frames, stored in the library 15 tab may be displayed.

Figure 2:
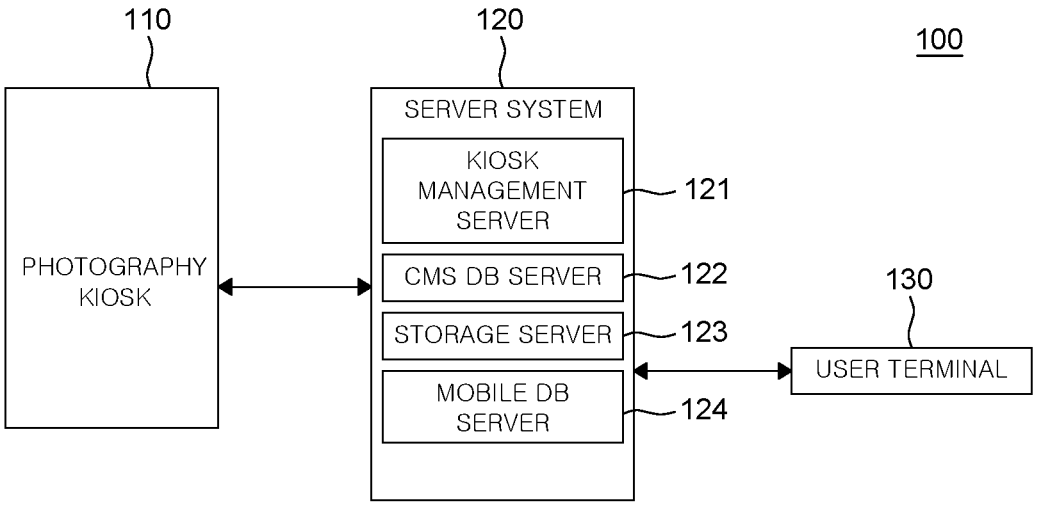
FIG. 2 is a block diagram showing an exemplary configuration of the system for providing a photography service according to an exemplary embodiment of the present disclosure.

FIG. 2 is a block diagram showing an exemplary configuration of the system for providing a photography service according to an exemplary embodiment of the present disclosure.

Referring to FIG. 2, the server system 120 may include a kiosk management server 121, a CMS DB server 122, a storage server 123, and a mobile DB server 124 to manage and store each piece of data. In FIG. 2, each server is shown as a separate configuration, but the present disclosure is not limited thereto. Each server shown does not necessarily need to be implemented as a separate configuration, and two or more servers may be implemented as one server, or may be configured as a module that performs a corresponding function within one server.

The kiosk management server 121 may be a server for managing the photography kiosk 110 by communicating with the photography kiosk 110. The kiosk management server 121 can receive and store device information of the photography kiosk 110 from the photography kiosk 110 and provide it to a kiosk manager. The device information of the photography kiosk 110 may include basic information (e.g., ID and hardware information) of the photography kiosk 110, information required for communication with the photography kiosk 110, information on a printer state (remaining paper and printer errors), software program operation state information, software program update information, and the like. Additionally, the kiosk management server 121 can manage an operating state (a normal operation, an idle state, error occurrence or the like) of the photography kiosk 110 in real time.

The CMS DB server 122 may be a server for storing user data and/or storage information (e.g., URL). The content management system (CMS) refers to a system that allows a photography kiosk manager to intuitively manage content. User data may include photographed image(s) and/or time-lapse video(s) data, data on frames selected by the user, payment information data, and matching data matching resources and member information. The CMS DB server 122 may provide an application programming interface (API) for receiving and storing image(s) and/or time-lapse video(s) photographed from the photography kiosk 110 and uploading them to the storage server 123.

The storage server 123 may be a server for storing image(s) and/or time-lapse video(s) photographed from the photography kiosk 110 by communicating with the CMS DB server 122 and/or the mobile DB server 124. The storage server 123 may provide a corresponding user's photographed image(s) and/or time-lapse video(s) among stored resources (e.g., photographed image(s) or time-lapse video (s)) to the user terminal 130, based on the matching data stored in the CMS DB server 122.

The mobile DB server 124 may be a server for storing member information and/or file address information. As an example, the mobile DB server 124 may receive an image and/or time-lapse video request from the user terminal 130 and transmit the member information stored in the CMS DB server 124. The mobile DB server 124 does not store photographed image(s) and/or time-lapse video(s) files, but may store file address information that allows the user to download them directly from the application or storage server 123.

The photography kiosk 110, the server system 120, the individual servers 121, 122, 123, 124 that constitute the server system 120, and the user terminal 130 shown in FIG. 2, may operate to exchange data with each other through a communication network. The communication network according to an exemplary embodiment of the present disclosure may be configured regardless of a communication mode, such as a wired communication or wireless communication, and may include various communication networks such as a local area network (LAN), a metropolitan area network (MAN), a wide area communication network (WAN), and the like. Preferably, the communication network referred to in the present specification may be the known Internet or world wide web (WWW). However, the communication network is not necessarily limited thereto and may include a known wired or wireless data communication network, a known telephone network, or a known wired or wireless television communication network, in at least part. For example, the communication network is a wireless data communication network, and may implement at least a part of conventional communication methods such as WiFi communication, WiFi-Direct communication, long term evolution (LTE) communication, 5G communication, Bluetooth communication (Bluetooth low energy (BLE)), infrared communication, ultrasonic communication, and the like. For another example, the communication network is an optical communication network and may implement at least a part of conventional communication methods such as light fidelity (LiFi) and the like.

Figure 3A:
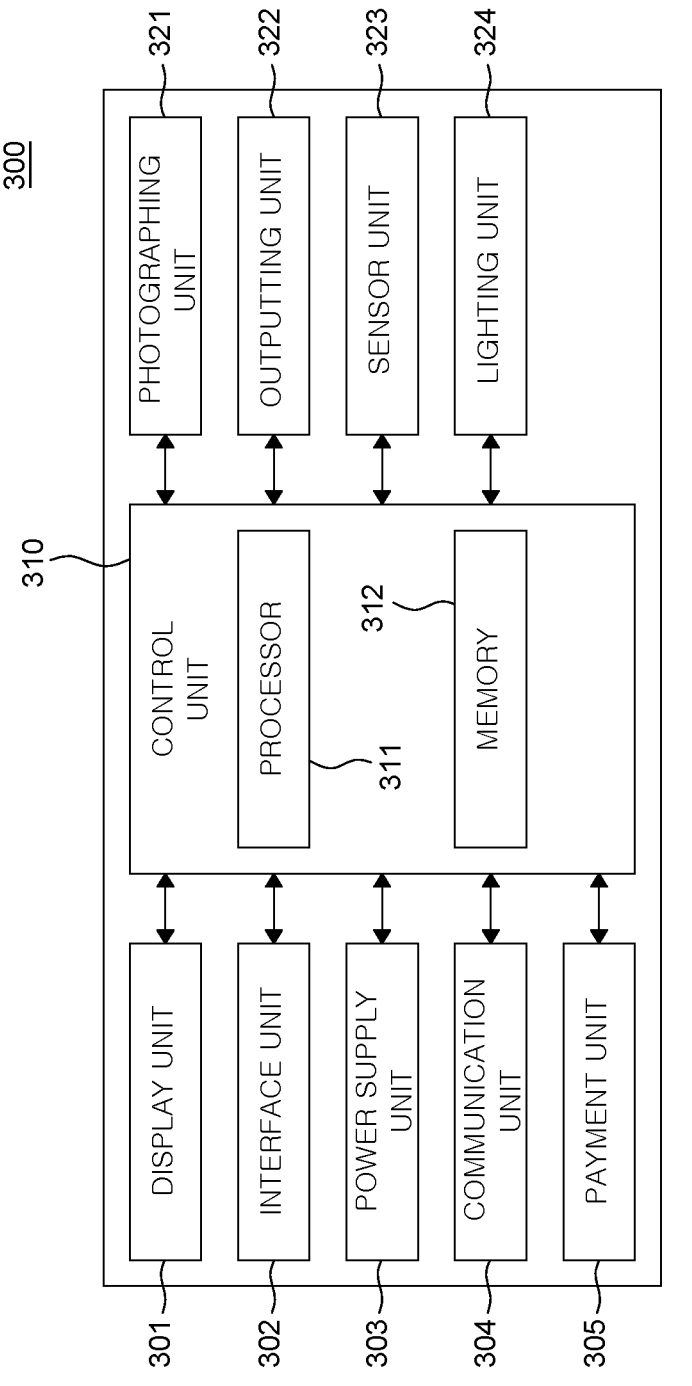
FIGS. 3A and 3B are block diagrams showing an exemplary configuration of a photography kiosk for providing a photography service according to an exemplary embodiment of the present disclosure.
Figure 3B:
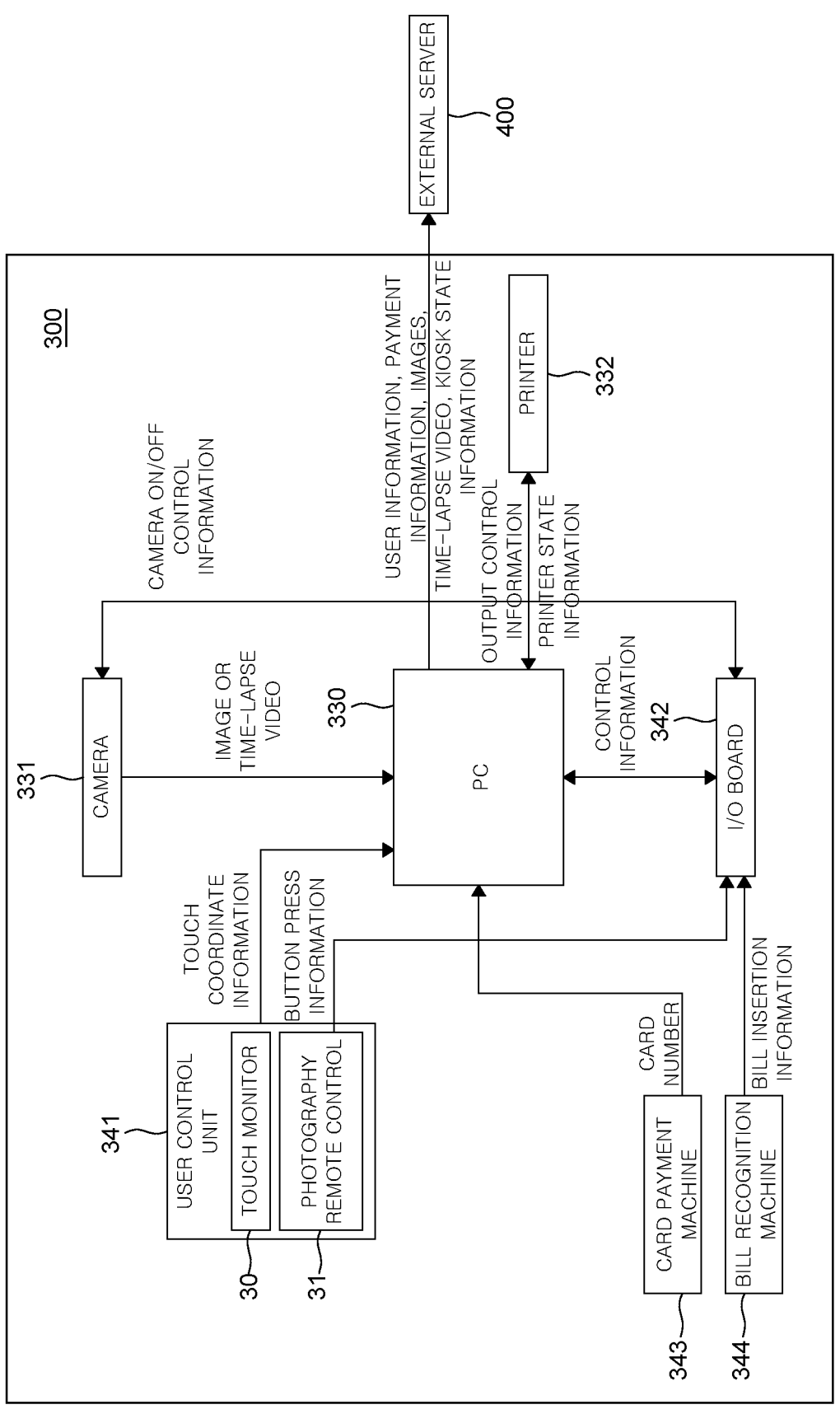

FIGS. 3A and 3B are block diagrams showing an exemplary configuration of a photography kiosk for providing a photography service according to an exemplary embodiment of the present disclosure.

Referring to FIG. 3A, a photography kiosk 300 according to an exemplary embodiment of the present disclosure may include a display unit 301, an interface unit 302, a power supply unit 303, a communication unit 304, a payment unit 305, a control unit 310, a photographing unit 321, an outputting unit 322, a sensor unit 323, a lighting unit 324, and the like.

The display unit 301 can display a variety of information related to operations of the photography kiosk 300. For example, the display unit 301 may display a menu related to a photography service, an appearance of a subject that is being photographed, and the like. In addition, the display unit 301 may display user interface (UI) and graphic user interface (GUI) information according to displayed image(s) and/or time-lapse image(s). A detailed description of the information displayed by the display unit 301 described above is merely an example, and the present disclosure is not limited thereto.

The display unit 301 may include at least one of a liquid crystal display (LCD), a thin film transistor-liquid crystal display (TFT LCD), an organic light emitting diode (OLED), a flexible display, a three-dimensional (3D) display, an electronic ink (e-ink) display, and a light emitting diode (LED).

The interface unit 302 is a component for receiving a user input required for photography services such as photographing and printing from the user, and may be implemented as a physical key pad, a dome switch, a touch pad, a stick, a lever or the like, but the present disclosure is not limited thereto. In an exemplary embodiment of the present disclosure, the display unit 301 may form a layer structure with a touch sensor or may be integrated with the touch sensor, thereby being implemented as a touch screen. This touch screen can function as the display unit 301 of the photography kiosk 300 and also can function as the interface unit 302.

The power supply unit 303 may supply power to all or a part of components of the photography kiosk 300. For example, the power supply unit 303 may include a power management system, one or more power sources such as batteries or alternating current (AC), a charging system, a power failure detection circuit, a power converter or inverter, a power state indicator, or any other components for power generation, management, and distribution.

The communication unit 304 allows the photography kiosk 300 to transmit and receive data with a server system or external devices through a communication network. The photography kiosk 300 may bidirectionally transmit and receive data regarding photographed image(s) and/or time-lapse video(s), user information, and a link to a storage where data of image(s) and/or time-lapse video(s) are stored, with the server system, through the communication unit 304.

The payment unit 305 allows a user to pay for services provided through the photography kiosk 300 through a card, cash, mobile pay, virtual currency, or the like.

The control unit 310 may perform an overall control of the photography kiosk 300. In an exemplary embodiment of the present disclosure, when a photography condition is selected by a user through the interface unit 302, payment is processed by the payment unit 305, and then, a photography instruction is input again through the interface unit 302, the control unit 310 may control the photographing unit 321 and photograph a subject. The control unit 310 may receive photographed image(s) and/or time-lapse video(s) and transmit them to the server system through the communication unit 304. The control unit 310 may receive a download web address link for access to the corresponding image(s) and/or time-lapse video(s) from the server system and based on this, control the outputting unit 322 to issue a two-dimensional code.

In an exemplary embodiment of the present disclosure, the control unit 310 may include a processor 311 and a memory 312.

The control unit 310 may include one or more processors 311. The one or more processors 311 included in the control unit 310 may be integrated into one chip or may be physically separated therefrom. In addition, the processor 311 and memory 312 may be implemented as a single chip. Examples of the memory 312 may include volatile memories such as S-RAM and D-RAM, and may also include non-volatile memories such as a flash memory, a read only memory (ROM), an erasable programmable read only memory (EPROM), and the like.

The photographing unit 321 may photograph a subject located in a photography space of the photography kiosk 300 according to a control signal of the control unit 310.

The outputting unit 322 may print a photo output including photographed photo image(s) or time-lapse video(s), and a two-dimensional code that allows for access to the image(s) or time-lapse video(s) stored in the server system. In an exemplary embodiment of the present disclosure, the photographing unit 321 and the outputting unit 322 may include a camera and a printer, respectively.

The sensor unit 323 may detect a user's location in front of the photography kiosk 300 or movement of the user located in front of the photography kiosk 300.

The lighting unit 324 may include lighting(s) necessary for the photographing unit 321 to perform a photographing operation.

Referring to FIG. 3B, the photography kiosk 300 according to an exemplary embodiment of the present disclosure may include a personal computer (PC) 330, a camera 331, a printer 332, a user control unit 341, an I/O board 342, a card payment machine 343, a bill recognition machine 344, and the like, and components included in the photography kiosk 300 can exchange a variety of information with each other.

The camera 331 may provide photographed image(s) and/or time-lapse video(s) to the PC 330. Additionally, the camera can receive a camera on/off control signal from the I/O board 342.

The printer 332 may receive output control information from the PC 330 and transmit printer state information to the PC 330.

The I/O board 342 may receive control information (pieces of control information) transferred to each of the components from the PC 330 or from each of the component to the PC 330.

The user control unit 341 may include a touch monitor 30 and/or a photography remote control 31. The touch monitor 30 may transmit touch coordinate information input by the user to the PC 330. The photography remote control 31 can transmit button press information to the PC 330 through the I/O board 342.

When the user selects card payment, the card payment machine 342 may transmit card information (e.g., card numbers) of a card input by the user to the PC 330. When the user selects cash payment, the bill recognition machine 344 may transmit bill insertion information of the bill inserted by the user to the PC 330 through the I/O board 342.

The PC 330 can perform an overall control of the components included in the photography kiosk 300. The PC 330 may transmit user information, payment information, images, time-lapse videos, kiosk state information, and the like, that are collected from various configurations to an external server 400. Referring to FIGS. 1 and 2, the external server 400 may be the server system 120.

Figure 4:
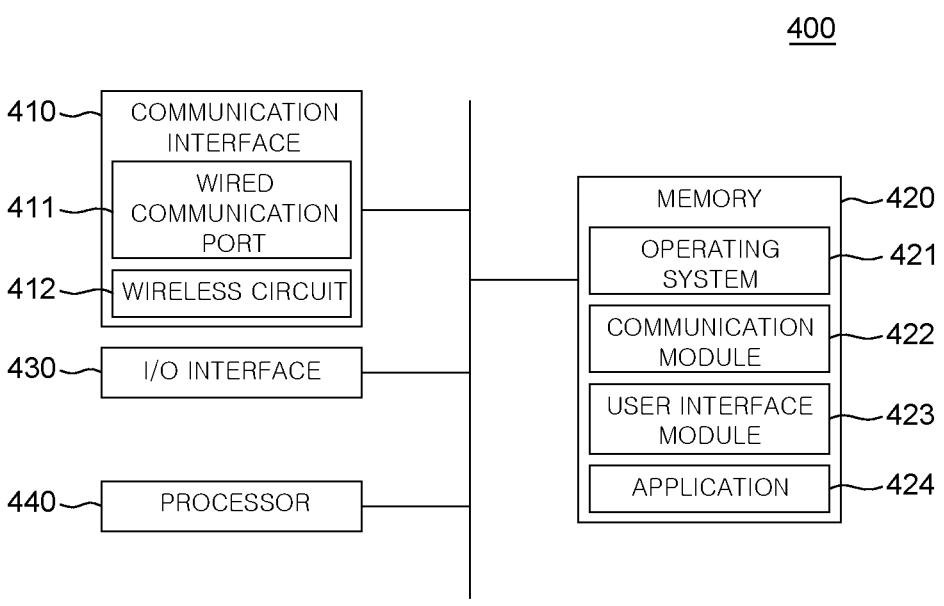
FIG. 4 is a block diagram showing an exemplary hardware configuration in which a server system or each server included in the server system according to an exemplary embodiment of the present disclosure can be implemented.

FIG. 4 is a block diagram showing an exemplary hardware configuration in which a server system or each server included in the server system according to an exemplary embodiment of the present disclosure can be implemented.

Referring to FIG. 4, a server 400 for providing a photography service may include a communication interface 410, a memory 420, an I/O interface 430, and a processor 440, and the respective components may communicate with each other through one or more communication buses or signal lines. Referring to FIGS. 1A to 2, the server 400 for providing a photography service may be the server system 120.

The communication interface 410 may be connected to a photography kiosk and/or a user terminal through a wired/wireless communication network to exchange data.

For example, the communication interface 410 may receive user information, payment information, image(s), time-lapse video(s), kiosk state information and the like, from the photography kiosk. In addition, the communication interface 410 may receive an image and/or time-lapse video request from the user terminal. For another example, the communication interface 410 may transmit control information for controlling the photography kiosk to the photography kiosk. The communication interface 410 may transmit images and/or time-lapse videos to the user terminal.

Meanwhile, the communication interface 410 that enables such transmission and reception of data includes a wired communication port 411 and a wireless circuit 412, and the wired communication port 411 may include one or more wired interfaces, for example, Ethernet, a universal serial bus (USB), Firewire, and the like. In addition, the wireless circuit 412 can transmit and receive data with an external device through RF signals or optical signals. Additionally, wireless communications may use at least one of a plurality of communication standards, protocols and technologies, for example, GSM, EDGE, CDMA, TDMA, Bluetooth, Wi-Fi, VoIP, Wi-MAX, or any other suitable communication protocols.

The memory 420 can store a variety of data used in self-photography services. For example, the memory 420 may store the device information of the photography kiosk 110, user data, storage information, photographed image(s) and/or time-lapse video(s), member information, and/or file address information.

In various exemplary embodiments, the memory 420 may include volatile or non-volatile recording media capable of storing a variety of data, instructions, and information. For example, the memory 420 may include at least one type of storage medium among a flash memory type, a hard disk type, a multimedia card micro-type, a card type memory (e.g., an SD or XD memory or the like), RAM, SRAM, ROM, EEPROM, PROM, a network storage, a cloud, or blockchain database.

In various exemplary embodiments, the memory 420 may store a configuration of at least one of an operating system 421, a communication module 422, a user interface module 423, and one or more applications 424.

The operating system 421 (e.g., embedded operating systems such as LINUX, UNIX, MAC OS, WINDOWS, VxWorks, and the like) may include various software components and drivers for controlling and managing general system works (e.g., memory management, storage device control, power management, and the like) and may support communication between various hardware, firmware, and software components.

The communication module 422 may support communication with other devices through the communication interface 410. The communication module 422 may include various software components for processing data that is received by the wired communication port 411 or the wireless circuit 412 of the communication interface 410.

The user interface module 423 may receive a user's request or input from a keyboard, a touch screen, a keyboard, a mouse, a microphone and the like, through the I/O interface 430 and provide a user interface on the display.

The applications 424 may include programs or modules that are configured to be executed by one or more processors 440. Here, an application for a photography service may be implemented on a server farm.

The I/O interface 430 may connect at least one of input/output devices (not shown) of the server 400 for providing a photography service, such as a display, a keyboard, a touch screen, and a microphone, to the user interface module 423. The I/O interface 430 may receive, together with the user interface module 423, user inputs (e.g., a voice input, a keyboard input, a touch input, and the like) and process instructions according to the received inputs.

The processor 440 may be connected to the communication interface 410, the memory 420, and the I/O interface 430 and control an overall operation of the server 400 for providing a photography service. The processor 440 may perform various instructions for downloading images that are photographed through applications or programs or time-lapse videos corresponding thereto from the user terminal.

The processor 440 may correspond to a computing device such as a central processing unit (CPU) or an application processor (AP). In addition, the processor 440 may be implemented in the form of an integrated chip (IC) such as a system on chip (SoC) in which various computing devices are integrated. Alternatively, the processor 440 may include a module for calculating an artificial neural network model, such as a neural processing unit (NPU).

FIG. 4 is only an example of the configuration of the server 400, and in the server 400, some of the components shown in FIG. 4 may be omitted. In addition, the server 400 may further include additional components not shown in FIG. 4, or may have a configuration or arrangement that combines two or more components. The components that may be included in the server 400 may be implemented as hardware, software, or a combination of both hardware and software, including integrated circuits specialized for processing of one or more signals or applications.

Figure 5:
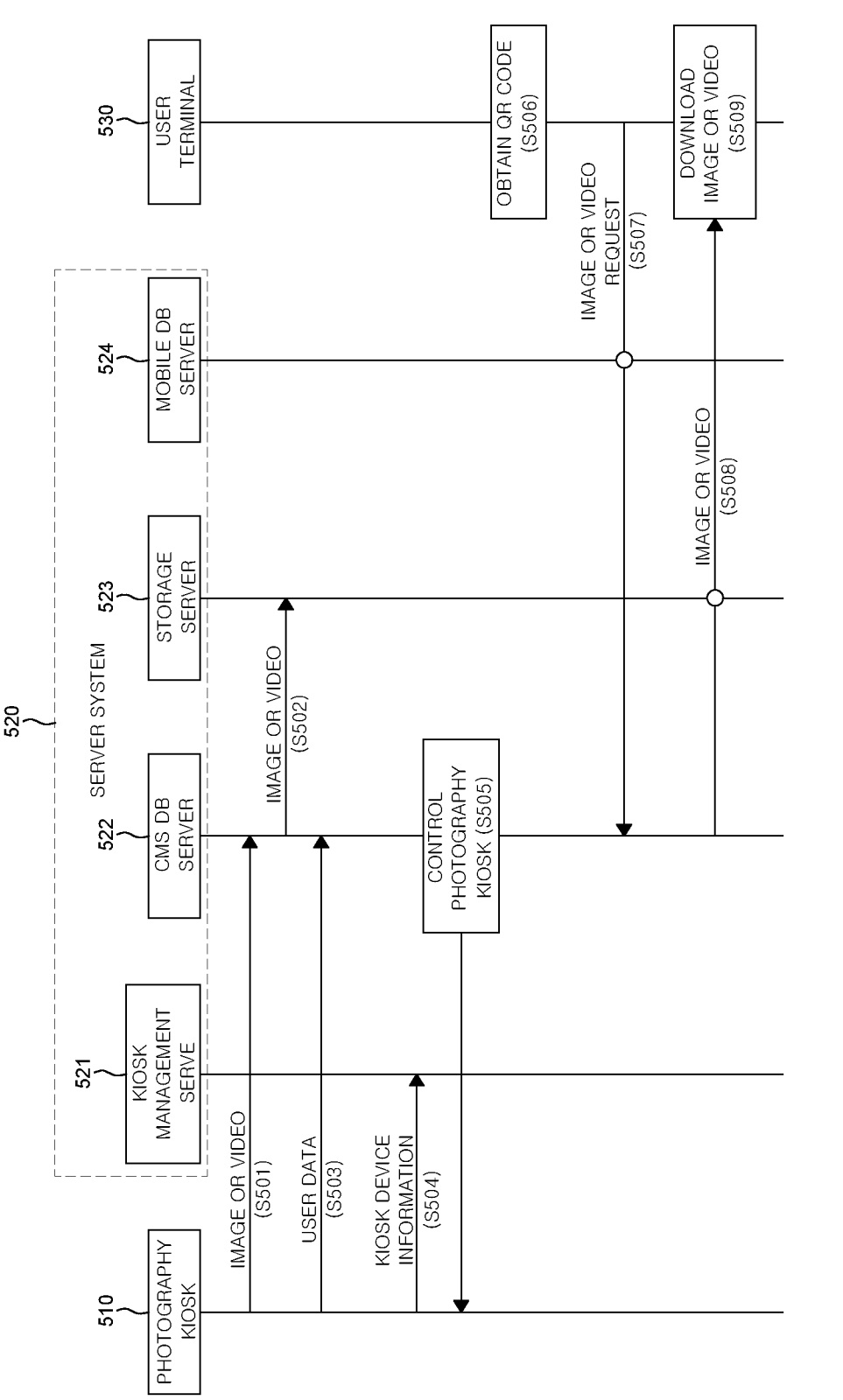
FIG. 5 is a flowchart schematically showing overall steps of downloading an image or time-lapse video in the system for providing a photography service according to an exemplary embodiment of the present disclosure.

FIG. 5 is a flowchart schematically showing a process for downloading an image or time-lapse video from the system for providing a photography service according to an exemplary embodiment of the present disclosure.

The self-photography system according to an exemplary embodiment of the present disclosure may include a photography kiosk 510, a server system 520, and a user terminal 530.

The server system 520 may include a kiosk management server 521, a CMS DB server 522, a storage server 523, and a mobile DB server 524. In FIG. 5, the kiosk management server 521, the CMS DB server 522, the storage server 523, and the mobile DB server 524 are respectively shown as separate configurations, but the present disclosure is not limited thereto. Two or more servers shown combine together and may be implemented together as one server, or each of the servers shown may be implemented as a module within the server system 520.

Referring to FIG. 5, a step of providing photographed image(s) and/or time-lapse video(s) files to a user using the photography kiosk 510 through communication between the photography kiosk 510 and the server system 520 is shown.

In an exemplary embodiment, the photography kiosk 510 may upload photographed images and/or videos to the storage server 523 through an application programming interface (API) that is provided by the CMS DB server 522 in steps S501 to S502.

In step S501, when the user completes photographing through the photography kiosk 510, the photography kiosk 510 may transmit the photographed images and/or videos to the CMS DB server 522. The CMS DB server 522 may store the images and/or videos received from the photography kiosk 510.

In step S502, the CMS DB server 522 may transmit an image and/or video to the storage server 523. When the API (or API server) provided by the CMS DB server 522 receives an image and/or video file, it can upload the image and/or video file to the storage server 523.

In step S503, the photography kiosk 510 may transmit user data to the CMS DB server 522. The user data may include data of photographed image(s) and/or time-lapse video(s), data on frames selected by the user, payment information data, matching data matching resources and member information, and the like. The CMS DB server 522 may store received images and/or videos.

In step S504, the photography kiosk 510 may transmit kiosk device information to the kiosk management server 521. The device information of the photography kiosk 510 may include basic information (e.g., ID and hardware information) of the photography kiosk 510, information required for communication with the photography kiosk 510, information on an operating state (a normal operation, an idle state, error occurrence or the like) of the kiosk 510, information on a printer state (remaining paper and printer errors), software program operation state information, software program update information, and the like. The kiosk management server 521 may store the received device information of the photography kiosk 510.

In step S505, the CMS DB server 522 can control the photography kiosk 510 through the kiosk management server 521. Specifically, the CMS DB server 522 may control rebooting of the photography kiosk 510, provision of service coins, output of inspection messages, update requests. The kiosk manager may remotely manage the photography kiosk 510 in the content management system (CMS) by using the kiosk management server 521 and the CMS DB server 522.

In step S506, when the user captures a QR code of a printed photo output including the QR code, the user terminal 530 may obtain the QR code.

In step S507, the user terminal 530 may transmit an image and/or video request to the mobile DB server 524.

In step S508, the storage server 523 may transmit the stored image and/or video to the user terminal 530. In step S509, the user terminal 530 may download the received image and/or video.

The steps of S506 to S509 are explained in detail in FIG. 6 below.

Figure 6:
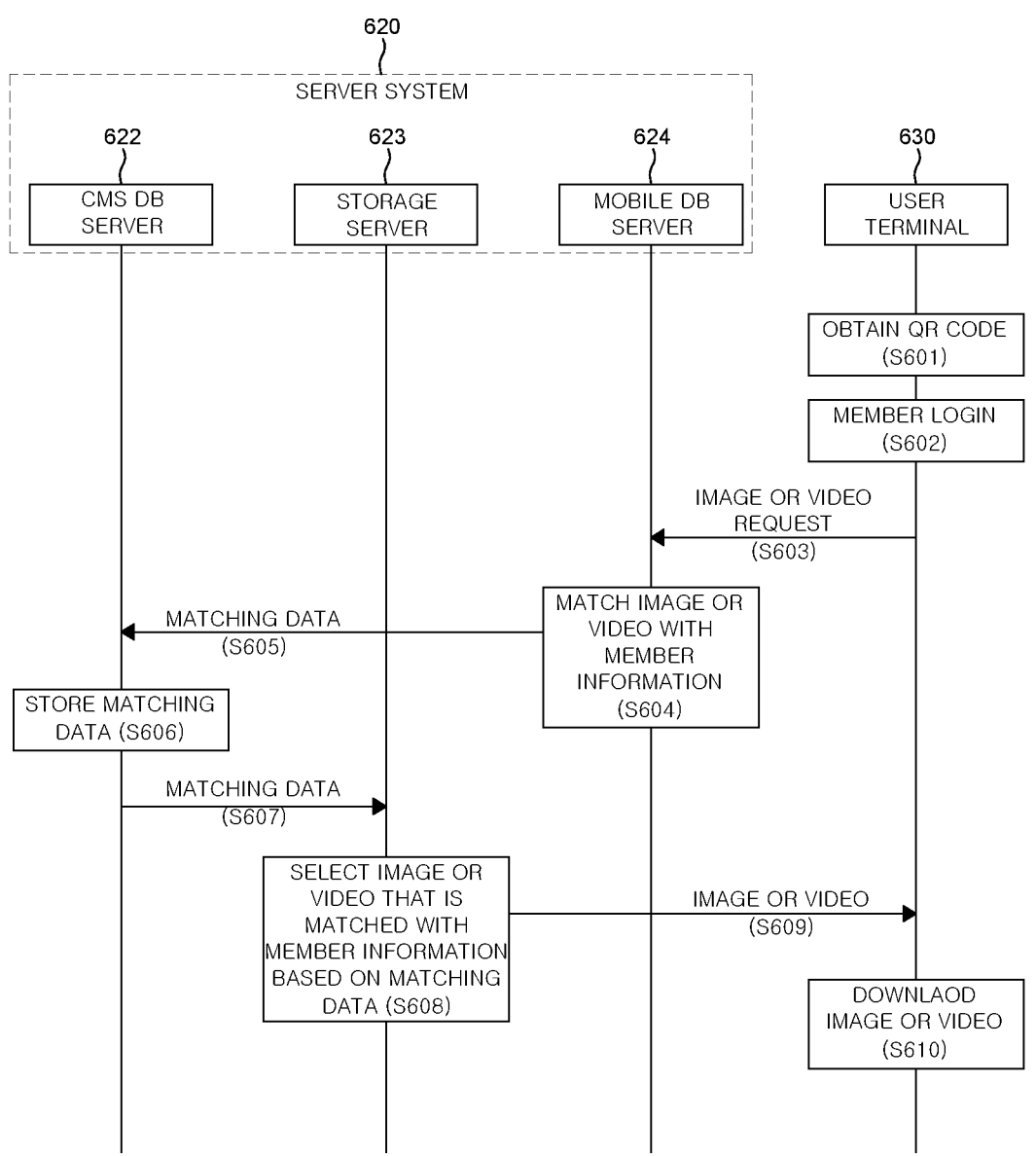
FIG. 6 is a flowchart schematically illustrating some of steps of downloading an image or time-lapse video through a photographic application in a system for providing a photography service according to another exemplary embodiment of the present disclosure.

FIG. 6 is a flowchart schematically illustrating some of steps of downloading an image or time-lapse video through a photographic application in a system for providing a photography service according to another exemplary embodiment of the present disclosure.

In step S601, when the user captures a QR code of a printed photo output including the QR code, a user terminal 630 may obtain the QR code.

In step S602, the user terminal 630 can access a download web address that is obtained by parsing the QR code and perform member login on an application page that is linked through the download web address.

In step S603, the user terminal 630 may transmit an image and/or video request to a mobile DB server 624.

In step S604, the mobile DB server 624 may match member information with images and/or videos captured by the user. According to embodiments, member information may be matched with images and/or videos captured by the user in an application installed on a server system 620 or the user terminal 630.

In step S605, matching data that is generated by matching the images and/or videos captured by the user with member information may be transmitted to a CMS DB server 622.

In step S606, the CMS DB server 622 may store the matching data generated by matching the images and/or videos with the member information.

In step S607, the matching data is transferred from the CMS DB server 622 to a storage server 623, and in step S608, the storage server 623 may select images and/or videos that are matched with the member information among the stored images and/or videos, based on the received matching data.

In step S609, the storage server 623 may transmit the selected image and/or video to the user terminal 630 or an application installed on the user terminal 630.

In step S610, the user terminal 630 may download the received user's image and/or video to a photo library within the application.

As an example, when a user captures a QR code of a printed photo output including the QR code using a basic camera application of the user terminal 630, the user can access a download web address, perform login (or login after registering as a member), and download images and/or videos. As another example, when a user captures a QR code of a printed photo output including the QR code within the photographic application of the user terminal 630, the image and/or video can be downloaded into the photographic application.

Figure 7:
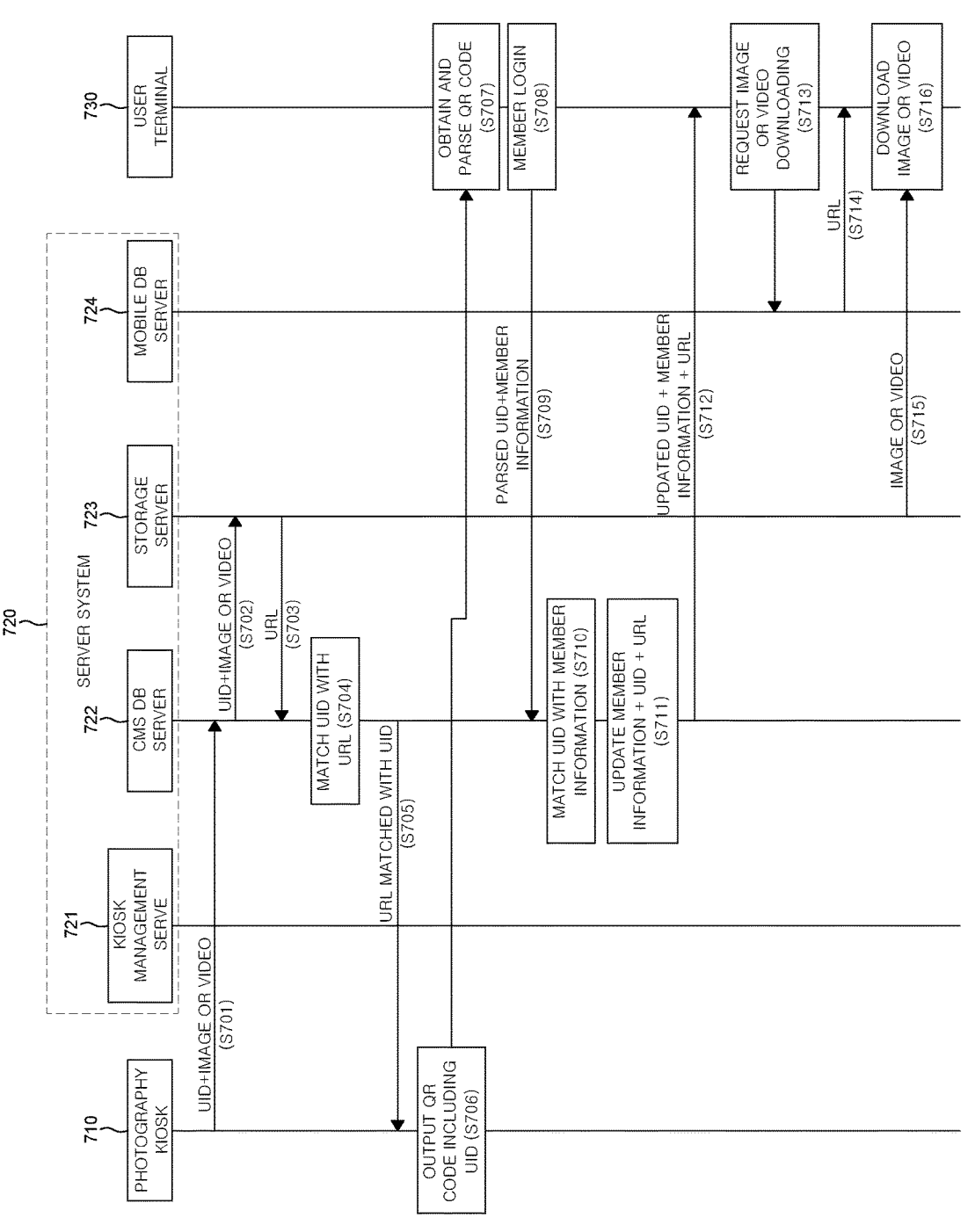
FIG. 7 is a flowchart schematically showing overall steps of downloading an image or time-lapse video in a system for providing a photography service according to still another exemplary embodiment of the present disclosure.

FIG. 7 is a flowchart schematically showing overall steps of downloading an image or time-lapse video in a system for providing a photography service according to still another exemplary embodiment of the present disclosure.

In step S701, when a user completes photographing through a photography kiosk 710, the photography kiosk 710 may transmit a user ID (UID), and photographed images and/or videos to a CMSDB server 722. The CMS DB server 722 may store the user ID (UID) and images and/or videos received from the photography kiosk 710.

In step S702, the CMS DB server 722 may transmit the user ID (UID) and the images and/or videos to a storage server 723. When an API (or API server) provided by the CMS DB server 722 receives the user ID (UID) and image and/or video files, it can upload them to the storage server 723.

In step S703, in response to the receiving of the user ID (UID) and the image and/or video, the storage server 723 may transmit a URL (or file address) where the image and/or video file is uploaded to the CMS DB server 722.

In step S704, the CMS DB server 722 may match the user ID (UID) and the URL (or file address) where the image and/or video file is uploaded.

In step S705, the CMS DB server 722 may transmit the URL that is matched with the UID to the photography kiosk 710.

In step S706, the photography kiosk 710 may output a photo output including a QR code having UID information.

In step S707, when the user captures a QR code of a printed photo output including the QR code, a user terminal 730 may obtain and parse the QR code.

In step S708, the user terminal 730 can access a download web address that is obtained by parsing the QR code and perform member login on a web page or application page that is linked through the download web address.

In step S709, the user terminal 730 may transmit the parsed UID and member information to the CMS DB server 722.

In step S710, the CMS DB server 722 may match the received UID and member information.

In step S711, the CMS DB server 722 may update the matched UID, member information, and URL.

In step S712, the CMS DB server 722 may transmit the updated UID, member information, and URL to a mobile DB server 724.

When the user terminal 730 requests downloading of images and/or videos to the mobile DB server 724 in step S713, the mobile DB server 724 may transmit the URL (or file address) to which image and/or video files are uploaded, to the user terminal 730.

In step S715, when the user accesses the URL where the image and/or video file is uploaded in the user terminal 730, the storage server 723 may transmit the image and/or video to the user terminal 730.

In step S716, the user terminal 630 may download the received image and/or video of the user to the user terminal 630 or to a photo library within the application.

Figure 8:
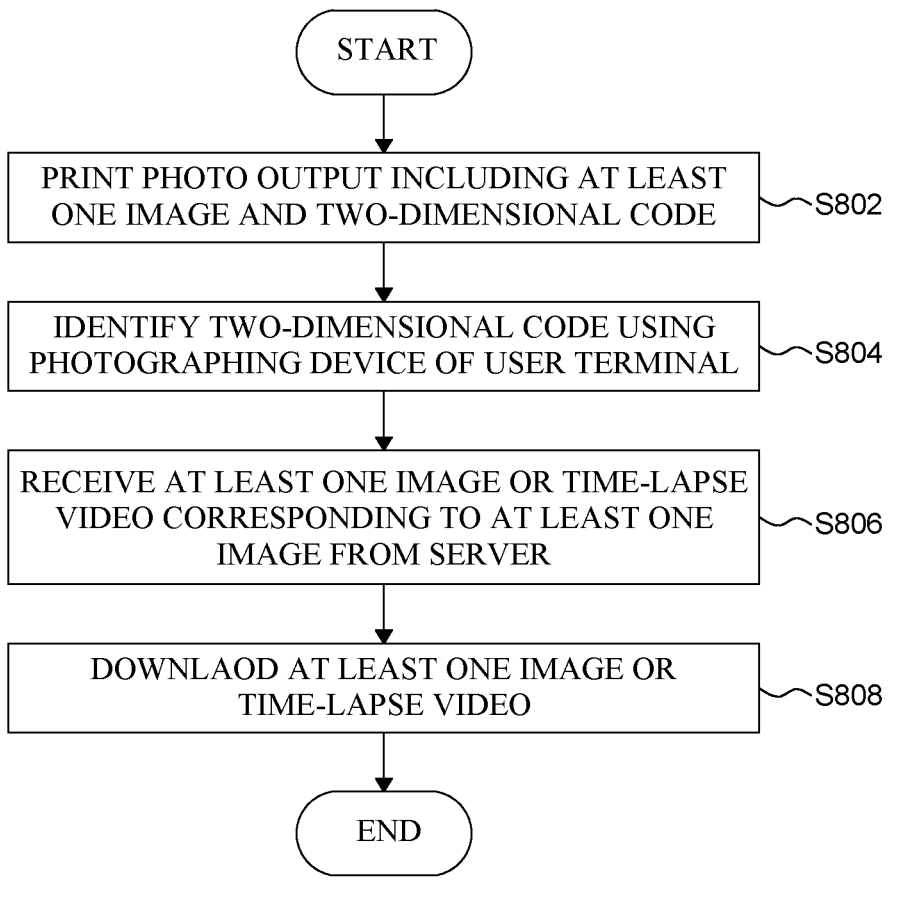
FIG. 8 is a flowchart showing an operation method of a system for providing a photography service according to an exemplary embodiment of the present disclosure.

FIG. 8 is a flowchart showing an operation method of a system for providing a photography service according to an exemplary embodiment of the present disclosure.

In step S802, a photography kiosk may print a photo output including at least one image and a two-dimensional code.

Here, the two-dimensional code may include a QR code or a barcode. The two-dimensional code may include information about a web address for downloading at least one image or a time-lapse video corresponding to the at least one image. According to embodiments, not only a two-dimensional code but also any identification mark that provides a link for allowing for downloading from a user terminal may be included therein.

In step S804, the user terminal may identify the two-dimensional code using a photographing device of the user terminal.

The user terminal can access a download web address that is obtained by parsing the two-dimensional code.

In step S806, the user terminal may receive at least one image or a time-lapse video corresponding to the at least one image from a server.

In S808, the user terminal may download at least one image or time-lapse video.

In an exemplary embodiment, the user terminal may identify the two-dimensional code using the user terminal's photographing device, and then perform member registration and login according to the user's input. The server may generate matching data by matching the at least one image or time-lapse video with the user's member information. The user terminal may download the at least one image or time-lapse video corresponding to the user from the server based on the matching data.

In another exemplary embodiment, an application may be installed on the user terminal. The user can capture a two-dimensional code using the application, and in this case, the user terminal can download at least one image or time-lapse video into a photo library of the application. The user terminal or application may provide a user interface for editing the downloaded at least one image or time-lapse video. The user terminal may correct at least one user's body portion included in the at least one image or time-lapse video by using the application, or may provide a user interface for applying a filter to the at least one image or time-lapse video.

In still another exemplary embodiment, the user can perform pre-setting to store the image or time-lapse video in the application when the user receives at least one image or time-lapse video from the server. Even if the user captures a two-dimensional code using a basic camera application of the user terminal without using the application, the user terminal can download at least one image or time-lapse video into the photo library of the application as it is previously set.

Programs executed by the terminals and servers described in the present disclosure may be implemented with hardware components, software components, and/or a combination of hardware components and software components. The program can be executed by any system that can execute computer-readable instructions.

Software may include computer programs, codes, instructions, or a combination of one or more of them, and may configure processing units to operate as desired or may command the processing units independently or collectively. Software may be implemented as a computer program including instructions stored on computer-readable storage media. Computer-readable recording media include, for example, magnetic storage media (e.g., a read-only memory (ROM), a random-access memory (RAM), a floppy disk, a hard disk, and the like) and optical read media (e.g., CD-ROM, digital versatile disc (DVD)). The computer-readable recording medium is distributed in computer systems that are connected through a network, so that computer-readable codes can be stored and executed in a distributed manner. The media may be readable by a computer, stored in a memory, and executed by a processor.

The computer-readable storage media may be provided in the form of non-transitory storage media. Here, the term 'non-transitory' only means that the storage medium does not include signals and is tangible, and does not distinguish whether data is stored semi-permanently or temporarily in the storage medium.

Additionally, the programs according to embodiments of the present disclosure may be included and provided in a computer program product. The computer program product is a product and can be traded between sellers and buyers. The computer program product may include a software program and a computer-readable storage medium in which the software program is stored. For example, the computer program product may be a product in the form of a software program (e.g., a downloadable application) that is distributed electronically by a device manufacturer or through an electronic market (e.g., Google Play Store, and App Store). For electronic distribution, at least a portion of the software program may be stored in the storage medium or created temporarily. In this case, the storage medium may be a storage medium of a manufacturer's server, an electronic market server, or a relay server that temporarily stores a software program.

The computer program product may include a storage medium of a server or a storage medium of a device in a system including the server and the device. Alternatively, when there is a third device (e.g., a smartphone) connected to the server or device for communication, the computer program product may include the storage medium of the third device. Alternatively, the computer program product may include a software program itself that is transmitted from the server to the device or the third device, or from the third device to the device. In this case, one of the server, the device, and the third device may execute the computer program product to perform the method according to the disclosed embodiments. Alternatively, two or more of the server, the device, and the third device may execute the computer program product and perform the method according to the disclosed embodiments in a distributed manner. For example, the server may execute the computer program product stored in the server and control the device connected to the server to perform the method according to the disclosed embodiments. As another example, the third device may execute the computer program product and control the device connected to the third device to perform the method according to the disclosed embodiment. When the third device executes the computer program product, the third device may download the computer program product from the server and execute the downloaded computer program product. Alternatively, the third device may execute a computer program provided in a pre-loaded state and perform the method according to the disclosed embodiments.

As described above, although the embodiments have been described with limited examples and drawings, various modifications and variations can be made by those skilled in the art from the above description. For example, even if the described techniques may be performed in an order different from that of the described method, and/or components, such as a described computer system or module, may be coupled or combined in a form different from that of the described method, or may be substituted with or replaced by other components or equivalents, appropriate results can be achieved.

What is claimed is:

1. A method for providing a photography service, the method comprising:
collecting, by a photography kiosk, user information of a user receiving a photo output from the photography kiosk, the photo output including at least one image or a time-lapse video corresponding to the at least one of image;
transmitting, from the photography kiosk to a server, the photo output and a user ID corresponding to the user information;
matching, in the server, the user ID with a uniform resource locator (URL) to which the photo output is uploaded;
transmitting, from the server to the photography kiosk, the URL matched with the user ID;
printing, by the photography kiosk, the photo output, the printed photo output including a two-dimensional code;
identifying, by a user terminal, the two-dimensional code using a photographing device of the user terminal;
accessing, by the user terminal, the URL transmitted from the server; and
receiving, by the user terminal, the photo output from the server and storing the received photo output in a photo library of an application installed in the user terminal, the receiving and storing of the photo output performed in response to the accessing.

2. The method of claim 1, further comprising
accessing, by the user terminal, a download web address obtained by parsing the two-dimensional code,
wherein the two-dimensional code includes a QR code or a barcode.

3. The method of claim 2, further comprising:
performing, by the user terminal, member registration and login according to a user input;
generating, by the server, matching data by matching the at least one image or the time-lapse video with member information; and
downloading, by the user terminal, the at least one image or the time-lapse video corresponding to the user input into the photo library of the application installed in the user terminal, based on the matching data from the server.

4. The method of claim 3, further comprising:
capturing the two-dimensional code using the application installed in the user terminal,
wherein the downloading is performed in response to the capturing.

5. The method of claim 4, wherein the downloading of the at least one image or the time-lapse video into the photo library is performed by pre-setting the user terminal to store the at least one image or time-lapse video in the application when the user terminal receives the at least one image or time-lapse video from the server.

6. A system for providing a photography service, the system comprising:
a photography kiosk configured to print a photo output including an image and an identification mark, the identification mark including a two-dimensional code;
a server configured to store the image or a time-lapse video corresponding to the image; and
a user terminal configured to
identify the identification mark using a photographing device,
receive the image or the time-lapse video corresponding to the image from the server, and
download the image or the time-lapse video,
wherein the photography kiosk is further configured to
collect user information of a user receiving the photo output from the photography kiosk, the photo output further including at least one image or a time-lapse video corresponding to the at least one of image, and
transmit, to the server, the photo output and a user ID corresponding to the user information,
wherein the server is further configured to
match the user ID with a uniform resource locator (URL) to which the photo output is uploaded, and
transmit, to the photography kiosk, the URL matched with the user ID, and
wherein the user terminal is further configured to
identify the two-dimensional code using the photographing device of the user terminal,
access the URL transmitted from the server, and
receive the photo output from the server and store the received photo output in a photo library of an application installed in the user terminal, the receiving and storing of the photo output performed in response to the accessing.

7. The system of claim 6,
wherein the two-dimensional code includes a QR code or a barcode, and
wherein the user terminal is further configured to access a download web address that is obtained by parsing the two-dimensional code.

8. The system of claim 7,
wherein the server is further configured to generate matching data by matching the at least one image or the time-lapse video with member information, and wherein the user terminal is further configured to perform member registration and login according to a user input, and download the at least one image or the time-lapse video corresponding to the user input into the photo library of the application installed in the user terminal, based on the matching data from the server.

9. The system of claim 8, wherein the user terminal is further configured to capture the two-dimensional code using the application installed in the user terminal, wherein the downloading is performed in response to the capturing.

10. The system of claim 9, wherein the downloading of the at least one image or the time-lapse video into the photo library is performed by pre-setting the user terminal to store the at least one image or time-lapse video in the application when the user terminal receives the at least one image or time-lapse video from the server.

11. The system of claim 9, wherein the user terminal is further configured to provide a user interface for editing the at least one image or the time-lapse video downloaded using the application.

12. The system of claim 9, wherein the user terminal is further configured to provide a user interface for using the application to perform at least one of correcting at least one portion included in the at least one image or the time-lapse video, and applying a filter to the at least one image or the time-lapse video.

* * * * *